United States Patent [19]

Wesselski et al.

[11] Patent Number: 5,158,331

[45] Date of Patent: Oct. 27, 1992

[54] PRELOADED LATCHING DEVICE

[75] Inventors: Clarence J. Wesselski, Alvin; Kornel Nagy, Houston, both of Tex.

[73] Assignee: The United States of America as represented by the Administrator of the National Aeronautics and Space Administration, Washington, D.C.

[21] Appl. No.: 660,755

[22] Filed: Feb. 25, 1991

[51] Int. Cl.⁵ .............................. B66L 1/66
[52] U.S. Cl. ............................ 294/94; 294/89
[58] Field of Search ................. 294/89, 94, 95

[56] References Cited

U.S. PATENT DOCUMENTS

| | | | |
|---|---|---|---|
| 1,326,569 | 12/1919 | Burdett | 294/94 |
| 3,479,722 | 11/1969 | Maness | 294/94 X |
| 4,017,115 | 4/1977 | Holt et al. | 294/94 X |
| 4,068,879 | 1/1978 | Torbet et al. | 294/95 X |
| 4,715,445 | 12/1987 | Smith, Jr. | 166/377 |
| 4,772,446 | 9/1988 | Meuschke | 376/262 |
| 4,828,027 | 5/1989 | Schnatzmeyer | 166/117.5 |

FOREIGN PATENT DOCUMENTS

| | | | |
|---|---|---|---|
| 1087450 | 4/1984 | U.S.S.R. | 294/94 |
| 937916 | 9/1963 | United Kingdom | 294/94 |

OTHER PUBLICATIONS

IBM Technical Disclosure Bulletin, Aug. 1979, vol. 22, No. 3, pp. 928–929.

5 Page Advertisement by Avibank Mfg., Inc., 210 South Victory Blvd., Burbank, Calif. 91503.

*Primary Examiner*—Margaret A. Focarino
*Assistant Examiner*—Joseph Pape
*Attorney, Agent, or Firm*—Russell E. Schlorff; Guy M. Miller; Edward K. Fein

[57] ABSTRACT

A latching device which is lever operated sequentially to actuate a set of collet fingers to provide a radial expansion and to actuate a force mechanism to provide a compressive gripping force for attaching first and second devices to one another. The latching device includes a body member having elongated collet fingers which, in a deactuated condition, are insertable through bores on the first and second devices so that gripping terminal portions on the collet fingers are proximate to the end of the bore of the first device while a spring assembly on the body member is located proximate to the outer surface of a second device. A lever is rotatable through 90° to move a latching rod to sequentially actuate and expand collet fingers and to actuate the spring assembly by compressing it. During the first 30° of movement of the lever, the collet fingers are actuated by the latching rod to provide a radial expansion and during the last 60° of movement of the lever, the spring assembly acts as a force mechanism and is actuated to develop a compressive latching force on the devices. The latching rod and lever are connected by a camming mechanism. The amount of spring force in the spring assembly can be adjusted; the body member can be permanently attached by a telescoping assembly to one of the devices; and the structure can be used as a pulling device for removing annular bearings or the like from blind bores.

20 Claims, 4 Drawing Sheets

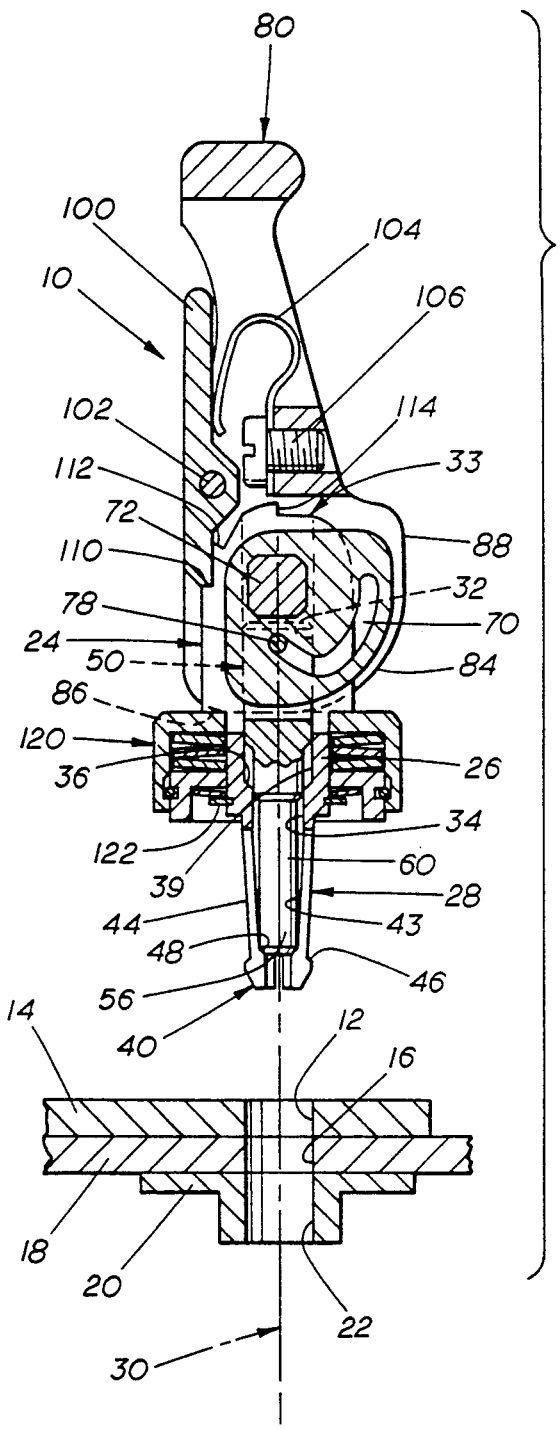
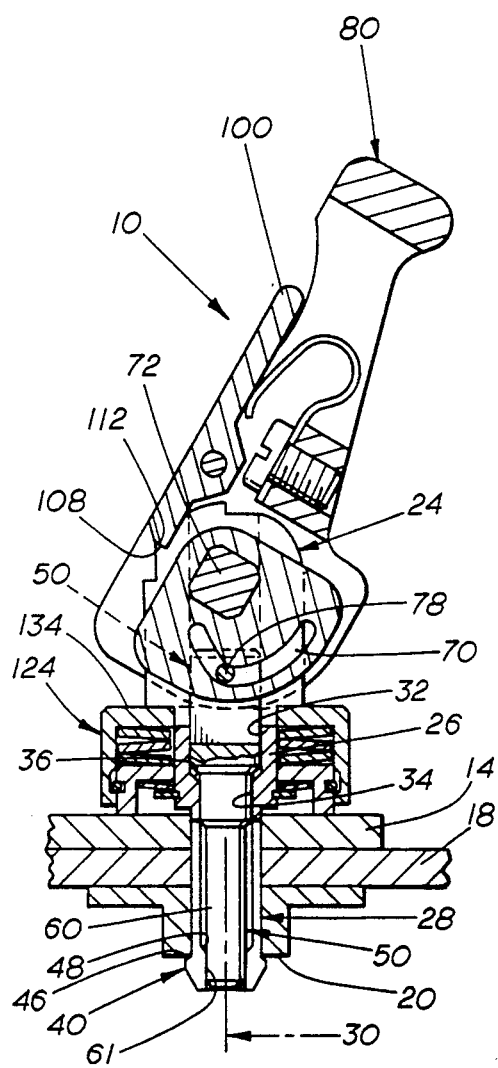
FIG.1
FIG.2

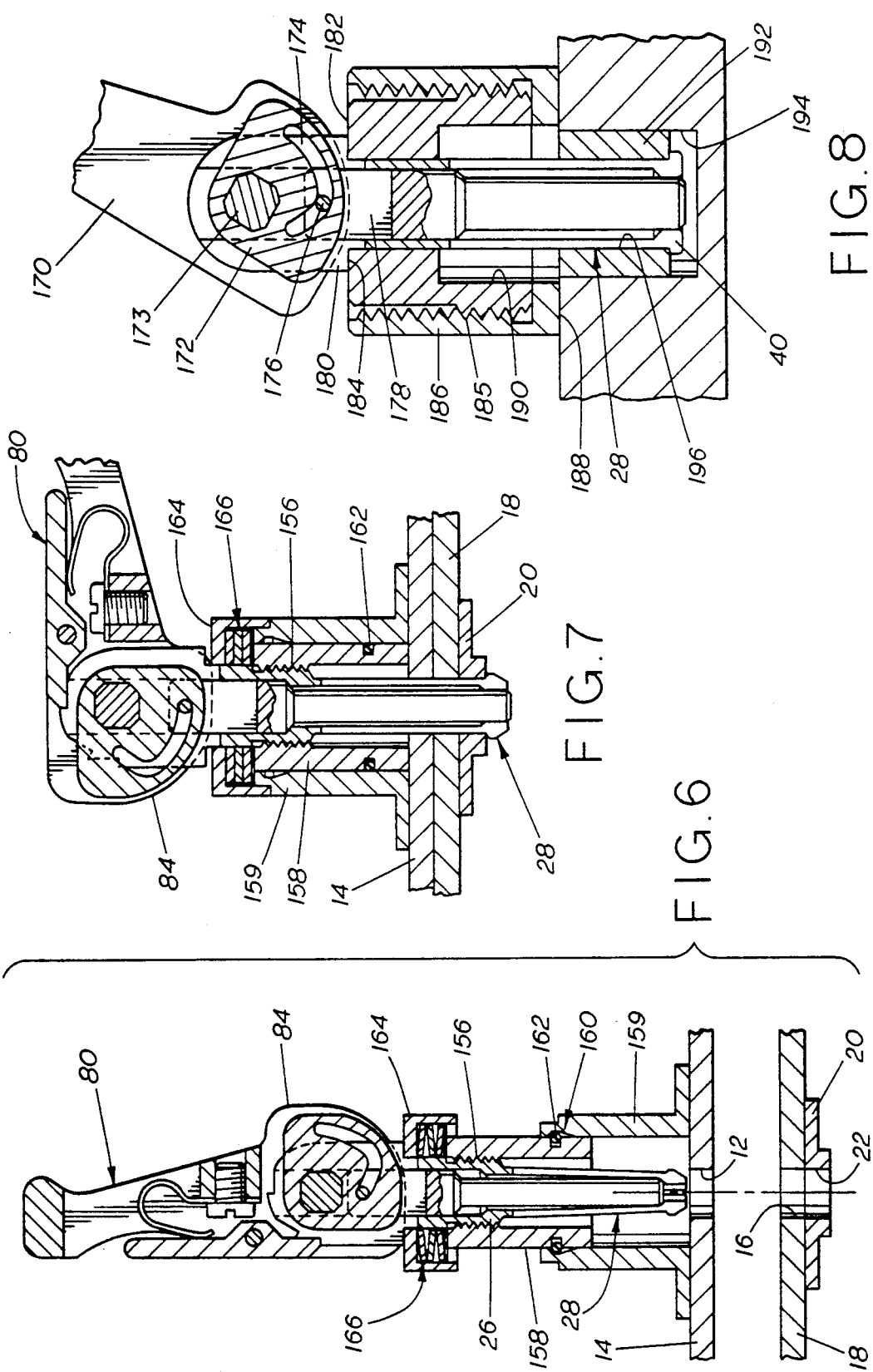

PRELOADED LATCHING DEVICE

ORIGIN OF THE INVENTION

The invention described herein was made by employees of the United States Government and may be manufactured and used by or for the Government of the United States of America for governmental purposes without the payment of any royalties thereon or therefor.

BACKGROUND OF THE INVENTION

Latch devices are widely used for interconnecting two components. It is a highly desirable attribute that the latch device be easily actuated and deactuated and also provide a secure coupling attachment. There are roughly three main categories of fasteners or latch devices, i.e.

(1) threaded fasteners such as bolts, nuts, and screws;

(2) pin fasteners such as cotter pins, quick release pins, cowling pins, etc.

(3) latching devices such as slide bolt action, hook, rotary, and over center connectors.

While prior art fasteners are well developed, designed, and tested for their intended use, they do have some generic disadvantages such as:

(1) threaded fasteners do preload components together to a suitable value but nearly all require tools and wrenches. In addition they are hard to handle with the gloved hands.

(2) pin fasteners usually do not require tools and wrenches to operate but they usually don't have the capability of preloading joints. When these latches are used in moving vehicles, resultant joints tend to be loose and to rattle;

(3) latching devices that don't require special tools to operate are mainly special purpose and must be incorporated early in the design phase of the component.

PRIOR ART

U.S. Pat. No. 1,326,569 issued to G. W. Burdett on Dec. 30, 1919 (class 294/94) relates to a ruptured gun shell extractor. To remove a ruptured tubular shell casing, a rod 5 has a head 6 where the head 6 extends beyond a tapered ramp 9 and shoulder 10 on a sleeve 8. When the rod 5 and the sleeve 8 are inserted through a cartridge chamber, the shoulders 10 engage the end of a cartridge and a lever 16 can be actuated to cause the head 6 to engage the fingers 11 and mechanically actuate the fingers so that further movement causes the shell to be extracted.

U.S. Pat. No. 4,715,445 issued to S. K. Smith on Dec. 29, 1987 (class 166/377) relates to a latch assembly for a downhole well tool. The latch assembly includes collet fingers which can be actuated by longitudinal relative motion of mandrel to lock with a locking recess in a well tool.

U.S. Pat. No. 4,772,466 issued to R. E. Meuschke on Sep. 20, 1988 (class 376/262) relates to connecting apparatus for insertion and removal of absorber rods from the adapter plate of the top nozzle of a nuclear reactor fuel assembly. FIGS. 3,4 and 7 show a connection sequence. Collet fingers depend from a plate 70. A socket 36 moves upper surfaces 83 above the grippers 88. Movement of the plate 70 upwardly covers a rod 90 to move the grippers 88 into latching engagement with the surfaces 83.

U.S. Pat. No. 4,828,027 issued to M. A. Schnatzmeyer on May 9, 1989 (class 166/117.5) relates to a well tool which has an operator rod. The rod is shiftable from a position supporting collet fingers against movement to a position releasing the fingers. The operator rod is spring biased to the position locking the collet fingers. A cam operator is utilized to actuate the operator rod.

A commercially available locking pin is sold by Avibank and a copy of advertising material is included herewith.

Avibank discloses an adjustable diameter pin where annular segments have wedge shaped configurations and can expand upon the application of compressive force to the ends of the pin.

SUMMARY OF THE INVENTION

The present invention is embodied in a latching device which is lever operated sequentially to actuate a set of collet fingers to provide a radial gripping force and to actuate a spring force mechanism to provide a compressive gripping force for attaching first and second devices to one another.

The structure of the latching device includes a body member having elongated collet fingers which, in a deactuated condition, are insertable through bores on the first and second devices so that gripping terminal portions on the collet fingers are proximate to the end of the bore of the first device while a spring assembly on the body member is located proximate to the outer surface of a second device. A lever is rotatable through 90° to move a latching rod to sequentially actuate and expand the collet fingers and to actuate the spring assembly by compressing it. During the first 30° of movement of the lever, the collet fingers are actuated by the latching rod to provide a radial expansion during the last 60° of movement of the lever, the spring assembly acts as a force mechanism and is actuated to develop a compressive latching force on the devices. The latching rod and lever are connected by a camming mechanism where the rod first actuates the collet fingers to radially engage the bores of the devices and where the lever together with the latched collet fingers compresses the spring assembly between the body member and the lever.

The amount of spring force in the spring assembly can be adjusted by adjusting the spacing of the spring assembly relative to the outer surface of the device so that the compressive force of the spring assembly is increased or decreased depending upon the adjustment of the spacing.

Further, if desired, the body member can be permanently attached by a telescoping assembly to one of the devices so that the latching device is carried by one of the devices.

Further, the structure can also be used as a pulling device for removing annular bearings or the like from blind bores. In this form the collet fingers are utilized to engage the lower end of a bearing and the force of the lever is utilized to pull the bearing out of a bore. In this arrangement, a spring assembly is not utilized and the bore in the body is great enough to allow passage of the bearing.

DESCRIPTION OF THE DRAWINGS

FIG. 1 is a view in longitudinal cross section showing a latching device in position for use;

FIG. 2 is a view similar to FIG. 1 but showing the latching device of FIG. 1 after the lever has been moved 30° and the expander rod has applied a radial latching force to the collet fingers;

FIG. 6 is a view in cross section showing a latching device modified for permanent attachment to a bore device;

FIG. 7 is a view in cross section similar to FIG. 6 but showing the latching device in an operative condition of latching; and.

FIG. 8 is a view in cross section of a modification of the latching device without a spring assembly which can be used for pulling annular devices such as a bearing from a blind bore.

DESCRIPTION OF THE INVENTION

Figure 3:
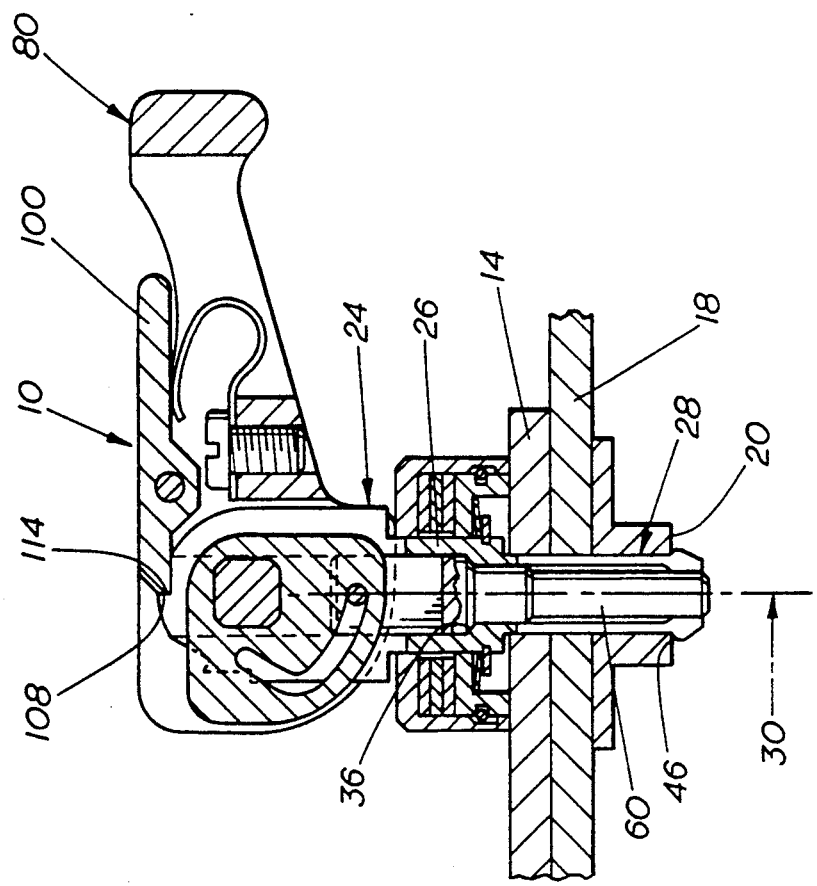
FIG. 3 is a view similar to FIG. 2 but showing the latching device after the lever has been moved 90° and the spring assembly is compressed to apply a spring compressive force.
Figure 4:
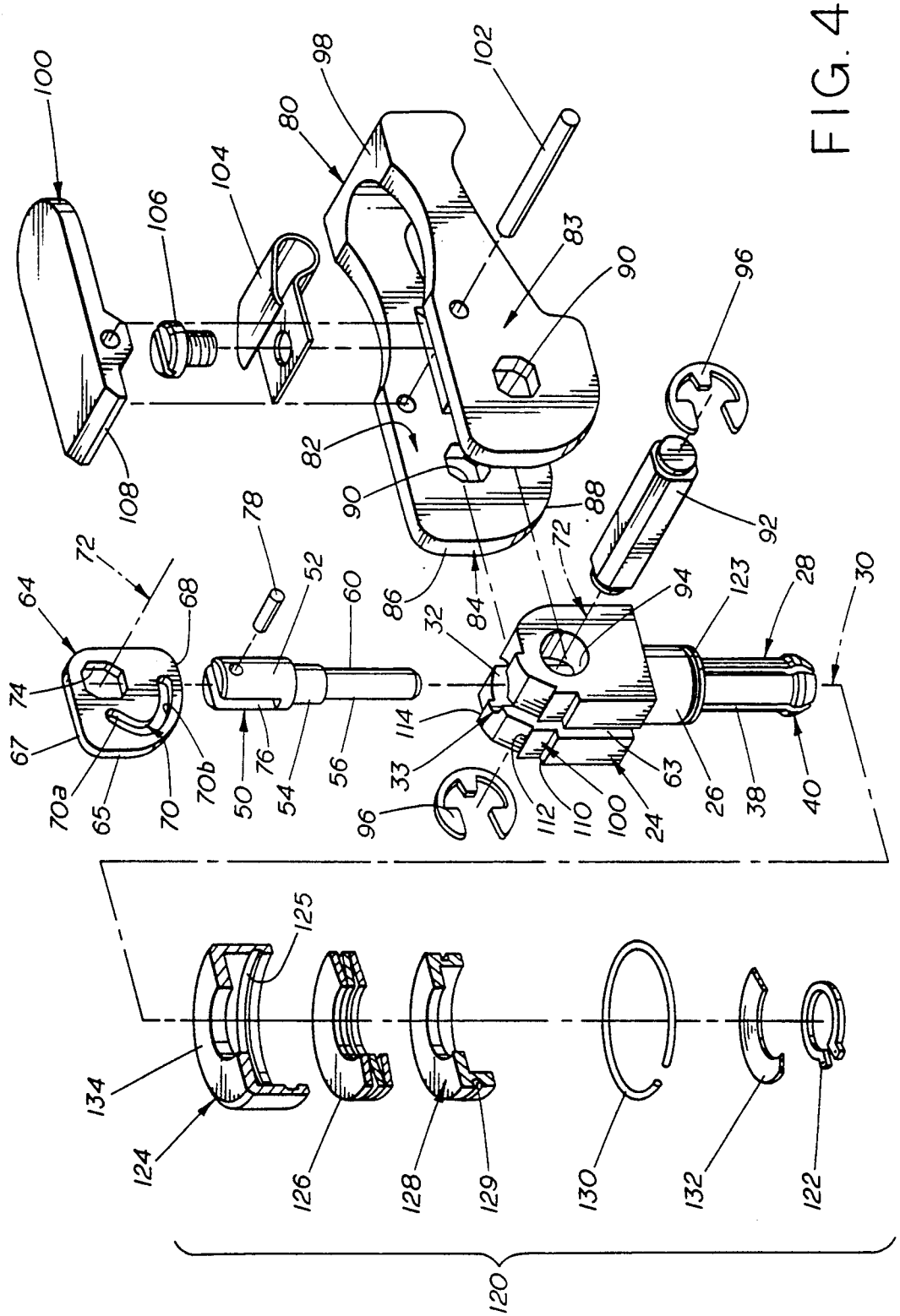
FIG. 4 is an exploded view of the assembly of FIGS. 1-3.

Referring now to the drawings, one form of the latching device 10 of the present invention is illustrated in FIG. 1 in an initial pre-engagement position; in FIG. 2 in a partially engaged position; in FIG. 3 in a fully engaged position; and in FIG. 4 in an exploded view of component parts.

In the illustration of FIGS. 1-4, a bore 12 in a flange member 14 is alignable with a bore 16 in a base member 18. A latching flange 20 is suitably attached to the base member 18 by screws or the like (not shown) and has a bore 22 aligned with the bores 12 and 16.

The latching device 10 includes a solid, somewhat cubeshaped body member 24 (see FIG. 4) where the body member 24 has a depending cylindrically shaped body portion 26 and connected, depending collet fingers 28 attached to the body portion 26. A central axis 30 extends lengthwise through a midportion of the body member 24 and through the center of the body portion 26 and the collet fingers 28. A bore 32 extends from an upper end surface 33 of the body member 24 to a smaller diameter bore 34 in the body portion 26. The bores 32 and 34 form an upwardly facing shoulder 36. The collet fingers 28 are formed by longitudinal, lengthwise extending slots 38 and have enlarged, terminal latching portions 40 which project radially outward and radially inwardly with respect to the circumferential inner and outer wall surfaces 43,44 of the collet fingers. As shown in FIG. 1, the latching portions 40 have outer upwardly facing shoulder surfaces 46 and inner upwardly facing shoulder surfaces 48. The collet fingers 28 are biased inwardly as shown in FIG. 1 and suitably heat treated to take a permanent set so that the collet fingers 28 are normally resiliently biased inwardly toward the central axis 30.

A cylindrically shaped expander rod 50 is slidably arranged in the bore 32 of the body member 24 with a first cylindrical cross section portion 52 in the bore 32, a second smaller cylindrically cross sectioned portion 54 in the bore 34 and a third still smaller cylindrically cross sectioned portion 56 in the collet fingers 28. In the pre-engagement position shown in FIG. 1, the lower end of the rod 50 is located just above the inner upwardly facing shoulders 48 on the collet fingers 28 while the downwardly facing shoulder between the body portions 52 and 54 is located above the upwardly facing shoulder 36 between the bores 32 and 34. In the intermediate position and in the full engagement position of the latching device 10, the outer cylindrical surface 60 of rod 50 engages the inner surfaces 61 of the terminal latching portions 40. (FIGS. 2 and 3). As shown in FIG. 1, in the pre-engagement position, the collet fingers 28 are resiliently biased inwardly into contact with the surface 60 of the expander rod 50 and the circumference of the outer surfaces 46 of the terminal latching portions 40 is slightly less than the circumference of the body portion at the upper end of the collet fingers 28.

As shown best in FIG. 4, the upper end of the body member 24 has a vertical rectangularly shaped slot 63 disposed along a plane which intersects the central axis 30. The width and the depth of the slot 63 are sized to receive a cam plate member 64. The cam plate member 64 has an arcuately shaped outer surface 65 which extends between side surfaces 67,68 located at a 90° or perpendicular relationship to one another. The plate member 64 has a curved interior cam slot 70. The cam slot 70 is located in a curved relationship about a central axis 72 of a square shaped drive socket 74 in the plate member 64. The plate member 64 is also received in a rectangular slot 76 in the expander rod 50. A cam pin 78 interconnects the expander rod 50 to the plate member 64 by extending through the interior of the cam slot 70. As will be explained more fully hereafter, when the cam plate member 64 is rotated about the drive socket axis 72, the cam plate member 64 moves the expander rod 50 from an unlocking position to a first latching position and then to a second latching position by virtue of the interconnection of the cam pin 78 and the cam slot 70.

To rotate the cam plate member 64, a saddle shaped actuating lever 80 has spaced apart connecting arms 82,83 which straddle opposite side surfaces of the body member 24. The connecting arms 82 and 83 respectively have an outer arcuately shaped cam surface 84 located between stop surfaces 86 and 88 at a 90° position relative to one another. The arms 82 and 83 have socket drive openings 90 about a central axis which are alignable with the socket opening 74 in the plate member 64. An elongated drive member 92 has a square shaped cross section with cylindrically configured corner surface. The square shaped cross section interconnects the arms 82 and 83 and the plate member 64 and the drive member 92 extends through a transverse bore 94 in the body member 24.

The central axis of the transverse bore 94 intersects the vertical axis 30 of the bore in the body member 24. The rounded cylindrically configured corner surfaces of the drive member 92 provide for a rotational fit of the drive member 92 in the bore 94. Retainer rings 96 are utilized to retain the drive member 92 in the bore 94 of the body member 24.

The arms 82 and 83 of the lever 80 extend to a transverse interconnecting handle portion 98 which is used to provide hand operated leverage for operation. In an initial unlatched position, the arms 82 and 83 are in a vertical condition as shown in FIG. 1 and the arms 82 and 83 are rotatable about the axis 72 when the arms are moved to a horizontal latching position (FIG. 3).

A locking tab member 100 is provided to lock the arms 82 and 83 in the first vertical position, an intermediate angular position and a locking horizontal position. The locking tab member 100 is a plate member which is pivotally connected to the arms 82 and 83 by a pivot pin 102. A spring member 104 is attached to the arms 82 and 83 by a screw 106 and normally urges the tab member 100 to a locking condition. The locking tab member 100 has a forward locking edge surface 108 which is engagable with a first locking shoulder 110 on the body member 24 (see FIG. 1). By rotating the arms 82 and 83, the locking tab member 100 is urged by the force of the spring member 104 to contact the outer surface of the body member 24. When the arms 82 and 83 are rotated from a vertical condition (FIG. 1), the tab member 100 is resiliently biased to contact the outer surface of the body member and is next engagable with an intermediate shoulder 112. Upon further rotation, the tab member is releasable from the intermediate shoulder 112 to engage a horizontal locking shoulder 114 when the arms are in a horizontal condition.

A spring loading assembly 120 is located on the cylindrical body portion 26 between the body member 24 and the collet fingers 28. A retainer ring 122 snaps into a retainer groove 123 on the body portion 26 and holds the spring assembly 120 in position. The spring assembly 120 includes a hollow spring cup member 124 which houses annular frusto-conical belleville spring washers 126 and a piston member 128. The piston member 128 has an annular groove 129 with a depth sufficient to contain a resilient retainer ring 130. In assembly, the retainer ring 130 is contained in the groove until the ring 130 on the piston member is adjacent to an internal annular groove 125 (shown in FIG. 4) in the spring cup member 124. The internal annular groove 125 in the spring cup member 124 has a depth of about one-half of the cross section of the retainer ring 130 so that the retainer ring 130 locks the piston member 128 in the spring cup member. An annular spring member 132 is disposed between the retainer ring 122 and the piston member 128 to maintain a tight system.

The operation of the foregoing system as well as the interrelationship of the structure should be reasonably apparent. As shown in FIG. 1, the arms 82 and 83 are in a vertical condition so that the collet fingers 28 are initially in a retracted condition for insertion through the bores 12, 16 and 22. The spring assembly 120 is in an initially uncompressed condition. The tab member 100 is biased into engagement of the locking edge surface 108 with the shoulder 110. The cam pin 78 is at one end of the cam slot 70.

The resiliently retracted collet fingers 28 of the locking device 10 are inserted through the bores in the two or more parts or devices to be fastened together so that the inner upwardly facing shoulder surfaces 48 on the terminal latching portions 40 are located below the lower face of the flange 20 while the spring assembly 120 rests on the flange 14 in an uncompressed condition.

The arms 82 and 83 of the lever 80 are rotated about the central axis 72 until the tab member 100 is biased into engagement of the locking edge surface 108 with the shoulder 112. During this motion the curved surfaces 84 of the arms 82 and 83 make contact with the upper surface 134 of the cup member 124. The piston member 128 is brought into engagement with the flange member 14 while the outer projections 40 of the collet fingers engage the lower surface of the flange 20 by the movement of the rod member 50 relative to the body member 24. The relative movement between the rod member 50 and the body member 24 is produced by the cam slot 70 which moves the cam pin 78 downwardly. As shown in the drawings, a first leg segment 70a of the cam slot 70 moves radially away from the central axis 72 to a junction with a second leg segment 70b over an angle of 30°. The second leg segment 70b is curved to remain constant radially from the central axis at an angular dispacement of 60°. The first leg segment 70a serves to engage the expander rod 50 with the terminal latching portions 40 to expand the latching portions 40 and the collet fingers 28 radially outward from the central axis 30 and into circumferential contact with the wall of the bores 12, 14 and 16. To do this the size of the collet diameter dimension is made very close to the diameter of the bores 12, 14 and 16. (See FIG. 2).

The arms 82 and 83 of the lever 80 are then rotated about the central axis 72 until the tab member 100 is biased into engagement with the stop shoulder 114. During this motion the outer curved surfaces 84 of the arms 82 and 83 engage the upper surface 134 of the cup member 124 and compress the springs 126.

The device releases in exactly the reverse. By depressing the tab member 100, the lock between the surfaces 108 and 116 is released and the lever rotates 60° to release the spring force. Note that at this time the devices are still latched to one another. The tab member 100 is again operated and the lever rotated 30° to the position shown in FIG. 1.

Figure 5:
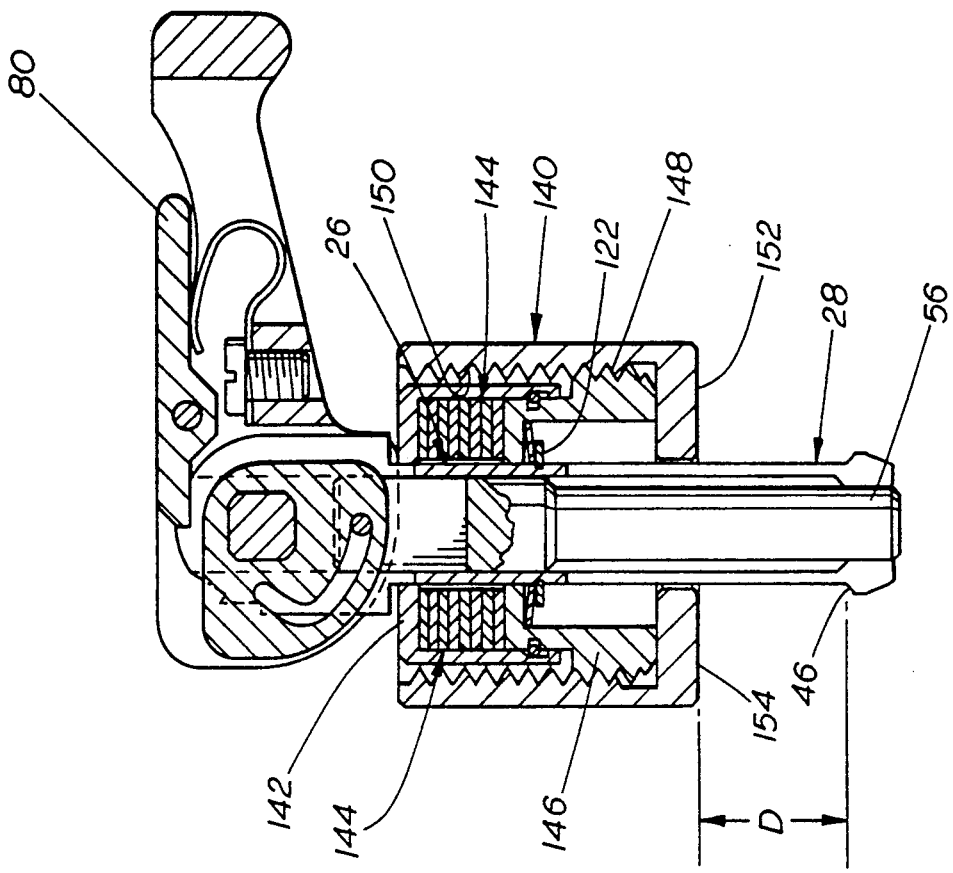
FIG. 5 is a view in cross section showing a modified form of the spring assembly.

Referring now to FIG. 5, a different form of the latch device is illustrated where the latch can have a variable spring latching force. As shown in FIG. 5, the collet fingers 28 are actuated by a similar structure as described with respect to FIGS. 1-4. However a different type of spring loaded assembly 140 is utilized. The spring loaded assembly 140 of FIG. 5 includes a cup member 142, belleville spring washers 144, and a piston member 146 where the piston member 146 is attached to the body member 26 by a retainer ring 122. The structure differs from the previously described system by virtue of an external thread 148 on the piston member 146 which is threadedly received by an internal thread 150 in an inverted cup member or collar 152. It can be seen that the bottom surface 154 of the collar 152 is spaced a distance D from the outer shoulder surfaces 46 on the collet fingers 28. By rotating the collar 152 relative to the piston member 146, the distance D and, hence the gripping force of the spring assembly can be varied.

In FIGS. 6 and 7, another embodiment of the present invention is illustrated where the latching device is permanently attached to one of the base members 14. In FIG. 6, the body member 26 is threadedly coupled at 156 to a tubular piston member 158. The tubular piston member 158 is slidably and telescopically received in a tubular support member 159 where the support member 159 is suitably attached to the flange member 14. The support member 159 has an internal latching groove 160 located near its upper end with a frustoconical ramp surface. A resilient retainer ring 162 is disposed in an annular groove in the piston member 158. In the position shown in FIG. 6, the retainer ring 162 resiliently holds the piston member 158 in an upper disengaged position. Referring to FIG. 7, when a downward force is applied to the piston member 158 through the lever 80, the piston member 158 and the collet fingers will travel downwardly so that the collet fingers 28 can be actuated as described heretofore. During the final 60° of travel of the lever, the cup member 164 is engaged by the cam surfaces 84 on the lever 80 and compresses the belleville spring members 166 to provide a spring force on the piston member 158 which is transmitted to the flange member 14.

In FIG. 8, the system is modified to provide a bushing or bearing removal tool. Many times, bushings or bearings are installed into blind holes and removal is difficult. In the device of FIG. 8, the lever 170 requires no locking tab member and is coupled to the cam plate 172 by the square shaped drive pin 173. A cam slot 174 and cam pin 176 reciprocate an actuating rod member 178 in a body member 180. An annular cap member 182 is seated against a downwardly facing shoulder 184 on the body member 180 and has a lower outer threaded portion 185 which is threadedly connected to an interior thread in an annular support member 186. The threaded connection permits adjustment of the spacing of a seating surface 188 on the support member 186 and the terminal latching portions 40 on the collet fingers 28. The cap member 182 and the support member 186 have a center bore 190 which is sized larger in diameter than the diameter of object 192 to be retrieved from a blind bore 194.

The collet fingers 28 are in an initial retracted condition for insertion into the bore 196 of the tubular object 192 so that the latching portions 40 are located below the end surface of the object 192 while the seating surface is seated on the base member. The lever 170 is rotated 30° to actuate the latching portions 40 as shown in FIG. 8. Further rotation of the lever 170 through the remaining 60° of rotation causes the cam surfaces on the lever to engage the cap member to provide a pulling force on the object 192. The lever can be reset to its initial position and the support member 186 rotated to take up slack so that the pulling operation can be repeated as necessary to dislodge the object 192 from the bore 194.

It will be apparent to those skilled in the art that various changes may be made in the invention without departing from the spirit and scope thereof and therefore the invention is not limited by that which is enclosed in the drawings and specifications but only as indicated in the appended claims.

We claim:

1. A force applying device for insertion through openings in two members for applying opposing axial forces to such members comprising:
   a body member having depending, tubular collet fingers disposed about a lengthwise extending central axis, said fingers having terminal external latching portions, and said finger members being normally flexed inwardly toward said central axis;
   a cylindrically shaped actuating member disposed within said collet member for longitudinal movement between a first position where said finger members are normally flexed inwardly and a second position where said fingers are moved outwardly away from said central axis and into engagement with the opening in one member;
   actuating means pivotally coupled to said body member for moving said actuating member between said first and second positions; and
   force means disposed on said body member and cooperating with said actuating means for engaging the other member when said latching portions are extended through the opening of said one member, said actuating means being pivotable to a third position after said actuating member is in said second position and said latching portions engage said one member for causing said force means and said latching portions to apply an axial loading force on said one member and on said other member in an opposite axial direction.

2. A force applying device as set forth in claim 1 wherein said force means includes a base member threadedly coupled to a piston member for changing the spacing of said base member relative to said latching portions.

3. The force applying device as set forth in claim 1 wherein said actuating means has a lever pivotally mounted about a pivot axis and has a cam member functionally attached to said lever for rotation therewith, said cam member being received in a slot in actuating member developing relative longitudinal movement between said body member and said actuating member in response to pivoting of said cam about said pivot axis.

4. The force applying device as set forth in claim 3 wherein said cam member is operative through a rotative angle of 30° of said lever for moving said fingers to said second position and through an additional angle of 60° of said lever for actuating said force means in moving from said second to said third position.

5. The force applying device as set forth in claim 3 wherein said cam member and said lever are functionally attached by a pivot pin member.

6. The force applying device as set forth in claim 1 wherein said force means includes a cup member containing belleville spring members and a closure piston member.

7. The force applying device as set forth in claim 6 wherein said piston member is threadedly coupled to an adjustment nut member for changing the spacing between said latching portions and said piston member.

8. The force applying device as set forth in claim 6 wherein said piston member is attached- to said body member and wherein said piston member is telescopically received in a tubular hose member;
   means for attaching said base member to said other member; and
   releasable means between said piston member and said base member for retaining said body member in position for insertion through said openings.

9. A latching device for insertion through aligned openings in two adjoining fixture members for releasably securing such fixture members to one another with an axial and a radial latching force comprising:
   a body member having depending, tubular collet fingers disposed about a lengthwise extending central axis, said fingers having terminal external latching portions, and said finger members being normally flexed inwardly toward said central axis;
   a cylindrically shaped actuating member disposed within said collet member for longitudinal movement between a first position where said finger members are normally flexed inwardly and a second position where said fingers are moved outwardly away from said central axis and into engagement with the opening in one fixture member;
   actuating means pivotally coupled to said body member for moving said actuating member between said first and second positions; and
   resilient force means disposed on said body member and cooperating with said actuating means for engaging the other fixture member to be secured when said latching portions are extended through the opening of said one fixture member, said actuating means being pivotable to a third position after said actuating member is in said second position and said latching portions engage said one fixture member for applying a resilient axial loading force on said fixture members by compressing said resilient force means through said actuating means and said latching portions.

10. The latching device as set forth in claim 9 wherein said actuating means has a lever pivotally mounted about a pivot axis and has a cam member functionally attached to said lever for rotation therewith, said cam member being received in a slot in actuating member and coupled to said actuating member for developing relative longitudinal movement between said body member and said actuating member in response to pivoting of said lever about said pivot axis.

11. The latching device as set forth in claim 10 wherein said cam member is operative through a rotative angle 30° of said lever for moving said fingers to said second position and through an additional angle of 60° of said lever for compressing said resilient force means in moving from said second to said third position.

12. The latching device as set forth in claim 10 wherein said cam member and said lever are functionally attached by a pivot pin member.

13. The latching device as set forth in claim 11 wherein said actuating means has a stop member for engaging said body member at said first, second and third positions.

14. The latching device as set forth in claim 9 wherein said resilient force means includes a cup member containing belleville spring members and a closure piston member.

15. The latching device as set forth in claim 9 wherein said resilient force means includes an adjustment member for changing the spacing between said latching portions and said resilient force means.

16. The latching device as set forth in claim 14 wherein said piston member is threadedly coupled to an adjustment nut member for changing the spacing between said latching portions and said piston member.

17. The latching device as set forth in claim 14 wherein said piston member is attached to said body member and wherein said piston member is telescopically received in a tubular base member;

means for attaching said base member to said other fixture member; and releasable means between said piston member and said base member for retaining said body member in position for insertion through said openings.

18. A latching device for insertion through aligned openings in two adjoining fixture members for releasably securing such fixture members to one another with an axial and a radial latching force comprising:

a body member having depending, tubular collet fingers disposed about a lengthwise extending central axis, said fingers having terminal external latching portions, and said finger members being normally flexed inwardly toward said central axis;

a cylindrically shaped actuating member disposed within said collet member for longitudinal movement between a first position where said finger members are normally flexed inwardly and a second position where said fingers are moved outwardly away from said central axis and into engagement with the opening in one fixture member;

actuating means including a lever pivotally coupled to said body member and cam members interconnecting said lever and said actuating member for moving said actuating member between said first, second and third positions; and resilient force means disposed on said body member and cooperating with said lever for engaging the other fixture member to be secured when said latching portions are extended through the opening of said one fixture member, said lever being pivotable to said third position after said lever is in said second position and said latching portions engage said one fixture member for applying a resilient axial loading force on said fixture members by compressing said resilient force means through said lever and said latching portions.

19. The latching device as set forth in claim 18 wherein said cam members are operative through a rotative angle of 30° of said lever for moving said fingers to said second position and through an additional angle of 60° of said lever for compressing said resilient force means in moving from said second to said third position.

20. The latching device as set forth in claim 19 wherein said actuating means has a stop member for engaging said body member at said first, second and third positions.

* * * * *